United States Patent
Graham et al.

(10) Patent No.: US 11,458,641 B2
(45) Date of Patent: Oct. 4, 2022

(54) ROBOTIC ARM ASSEMBLY CONSTRUCTION

(71) Applicants: General Electric Company, Schenectady, NY (US); Oliver Crispin Robotics Limited, Altrincham (GB)

(72) Inventors: Andrew Crispin Graham, Badminton (GB); David Scott Diwinsky, West Chester, OH (US)

(73) Assignee: General Electric Company, Schenectady, NY (US)

( * ) Notice: Subject to any disclaimer, the term of this patent is extended or adjusted under 35 U.S.C. 154(b) by 350 days.

(21) Appl. No.: 15/986,978

(22) Filed: May 23, 2018

(65) Prior Publication Data
US 2019/0358833 A1 Nov. 28, 2019

(51) Int. Cl.
*B25J 18/06* (2006.01)
*B33Y 10/00* (2015.01)
*B25J 9/06* (2006.01)

(52) U.S. Cl.
CPC ............... *B25J 18/06* (2013.01); *B25J 9/065* (2013.01); *B33Y 10/00* (2014.12); *Y10S 901/29* (2013.01); *Y10T 74/20323* (2015.01)

(58) Field of Classification Search
CPC .......... B25J 19/007; B25J 9/106; B25J 9/065; B33Y 10/00
See application file for complete search history.

(56) References Cited

U.S. PATENT DOCUMENTS

| 4,393,728 A * | 7/1983 | Larson ................. B25J 18/06 74/469 |
| 4,751,821 A * | 6/1988 | Birchard ................ A61F 2/58 60/527 |
| 4,848,179 A | 7/1989 | Ubhayakar |
| 6,408,224 B1 | 6/2002 | Okamoto et al. |
| 7,543,518 B2 * | 6/2009 | Buckingham ............ B25J 9/06 74/490.04 |
| 7,828,808 B2 * | 11/2010 | Hinman ................. A61B 1/008 606/108 |
| 8,214,083 B2 | 7/2012 | Kawai |
| 8,826,766 B2 | 9/2014 | Yasuda et al. |

(Continued)

FOREIGN PATENT DOCUMENTS

| CN | 1533321 A | 9/2004 |
| CN | 101237964 A | 8/2008 |

(Continued)

OTHER PUBLICATIONS

Gendreau et al, "3D-Printing: A promising technology to design three-dimensional microsystems", 2016 International Conference On Manipulation, Automation And Robotics At Small Scales (MARSS), IEEE, Jul. 18, 2016, pp. 1-5.

(Continued)

*Primary Examiner* — Jacob J Cigna
*Assistant Examiner* — Michael W Hotchkiss
(74) *Attorney, Agent, or Firm* — Fitch, Even, Tabin & Flannery LLP

(57) ABSTRACT

A method for constructing a robotic arm includes positioning a wire in a formation zone for the robotic arm; and forming a body of the robotic arm in the formation zone around the wire such that the body of the robotic arm encloses at least a portion of the wire.

21 Claims, 8 Drawing Sheets

(56) References Cited

U.S. PATENT DOCUMENTS

| | | | |
|---|---|---|---|
| 8,951,303 B2 | 2/2015 | Dehoff et al. | |
| 9,220,398 B2* | 12/2015 | Woodley | B25J 9/065 |
| 9,282,993 B1 | 3/2016 | Cohen et al. | |
| 9,393,000 B2* | 7/2016 | Donhowe | A61B 17/00 |
| 9,604,370 B2* | 3/2017 | Park | B25J 9/104 |
| 9,718,187 B2 | 8/2017 | Ishikawa et al. | |
| 9,757,856 B2* | 9/2017 | Oyola | B25J 9/065 |
| 10,046,461 B2* | 8/2018 | Ekas | B25J 9/104 |
| 10,052,761 B2* | 8/2018 | Langenfeld | B25J 9/126 |
| 10,571,642 B1* | 2/2020 | Cohen | G02B 6/25 |
| 10,618,162 B2* | 4/2020 | Norton | B25J 18/06 |
| 2011/0313568 A1 | 12/2011 | Blackwell et al. | |
| 2013/0110289 A1 | 5/2013 | Cho et al. | |
| 2013/0165754 A1* | 6/2013 | Frassica | A61B 1/00073 600/114 |
| 2013/0165908 A1* | 6/2013 | Purdy | A61B 1/00149 606/1 |
| 2013/0255410 A1* | 10/2013 | Lee | B25J 18/06 74/89.22 |
| 2014/0090506 A1* | 4/2014 | Tobey | B25J 19/0029 74/490.01 |
| 2014/0260755 A1* | 9/2014 | Dong | B25J 9/06 74/490.04 |
| 2015/0265438 A1 | 9/2015 | Hossainy et al. | |
| 2015/0283699 A1 | 10/2015 | Morin et al. | |
| 2015/0283710 A1 | 10/2015 | Schrader et al. | |
| 2015/0321427 A1 | 11/2015 | Gunnarsson et al. | |
| 2016/0001444 A1 | 1/2016 | Kwok et al. | |
| 2016/0008990 A1* | 1/2016 | Franz | B25J 9/065 74/490.05 |
| 2016/0016319 A1 | 1/2016 | Remirez et al. | |
| 2016/0046018 A1 | 2/2016 | Robertson et al. | |
| 2016/0052131 A1* | 2/2016 | Lessing | B25J 9/142 361/679.01 |
| 2016/0279789 A1* | 9/2016 | Axinte | B25J 9/104 |
| 2018/0242958 A1* | 8/2018 | Dayton | A61B 17/3478 |
| 2019/0015978 A1* | 1/2019 | Takagi | B25J 9/065 |
| 2019/0196449 A1 | 6/2019 | Zhang et al. | |
| 2019/0366536 A1* | 12/2019 | Graham | B25J 9/06 |
| 2020/0046209 A1* | 2/2020 | Fancher | A61B 1/0011 |
| 2020/0114505 A1* | 4/2020 | Kikuchi | B25J 9/065 |
| 2020/0315424 A1* | 10/2020 | Graham | A61B 1/005 |

FOREIGN PATENT DOCUMENTS

| | | |
|---|---|---|
| CN | 206840080 U | 1/2018 |
| WO | 2010040215 A1 | 4/2010 |
| WO | 2012037598 A1 | 3/2012 |
| WO | 2013078529 A1 | 6/2013 |
| WO | WO2017/193013 A1 | 11/2017 |

OTHER PUBLICATIONS

Krieger et al, "Multi-arm snake-like robot", 2017 IEEE International Conference On Robotics And Automation (ICRA), IEEE, May 29, 2017, pp. 24909-2495.

Roppenecker et al, "Multi arm snake-like robot kinematics", 2013 IEEE/RJS International Conference On Intelligent Robots And Systems, IEEE, Nov. 3, 2013, pp. 5040-5045.

Saari et al, "Fiber Encapsulation Additive Manufacturing: An Enabling Technology for 3D Printing of Electromechanical Devices and Robotic Components", 3D Printing And Additive Manufacturing, vol. 2, No. 1, Mar. 2015, pp. 32-39.

European Search Report Corresponding to Application No. 19175346 dated Oct. 24, 2019.

* cited by examiner

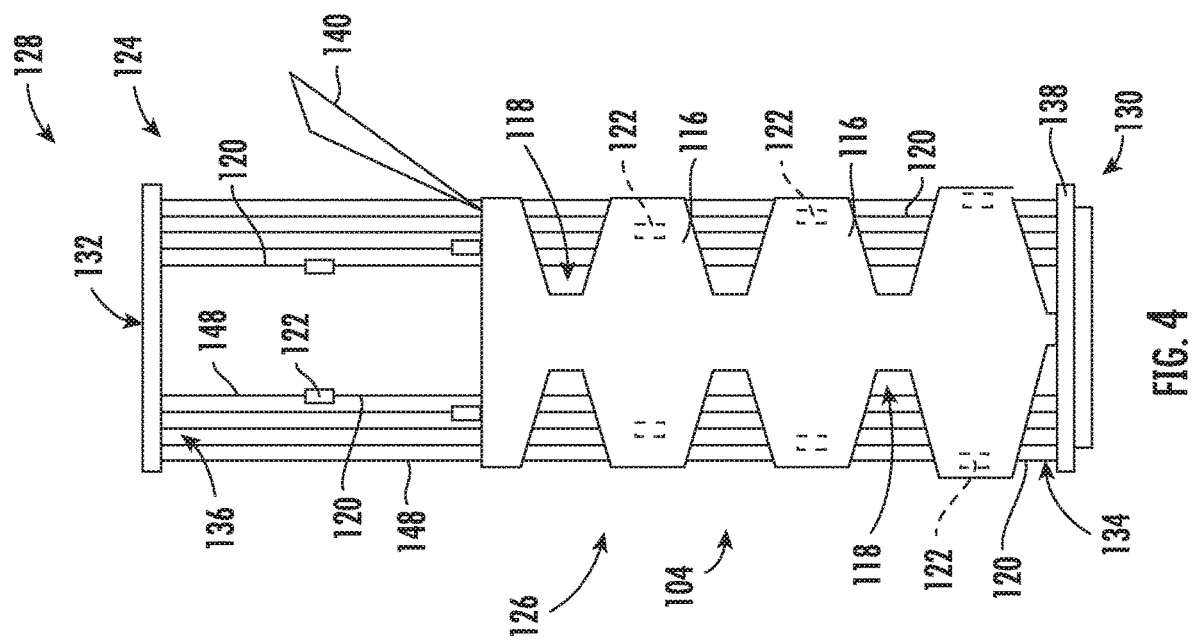
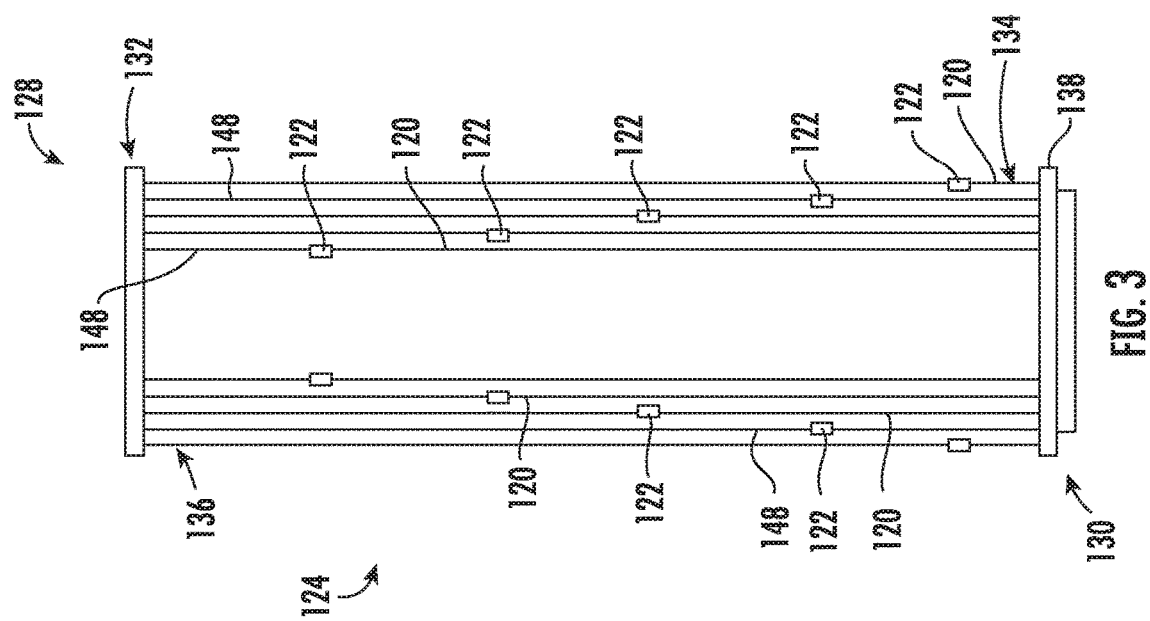

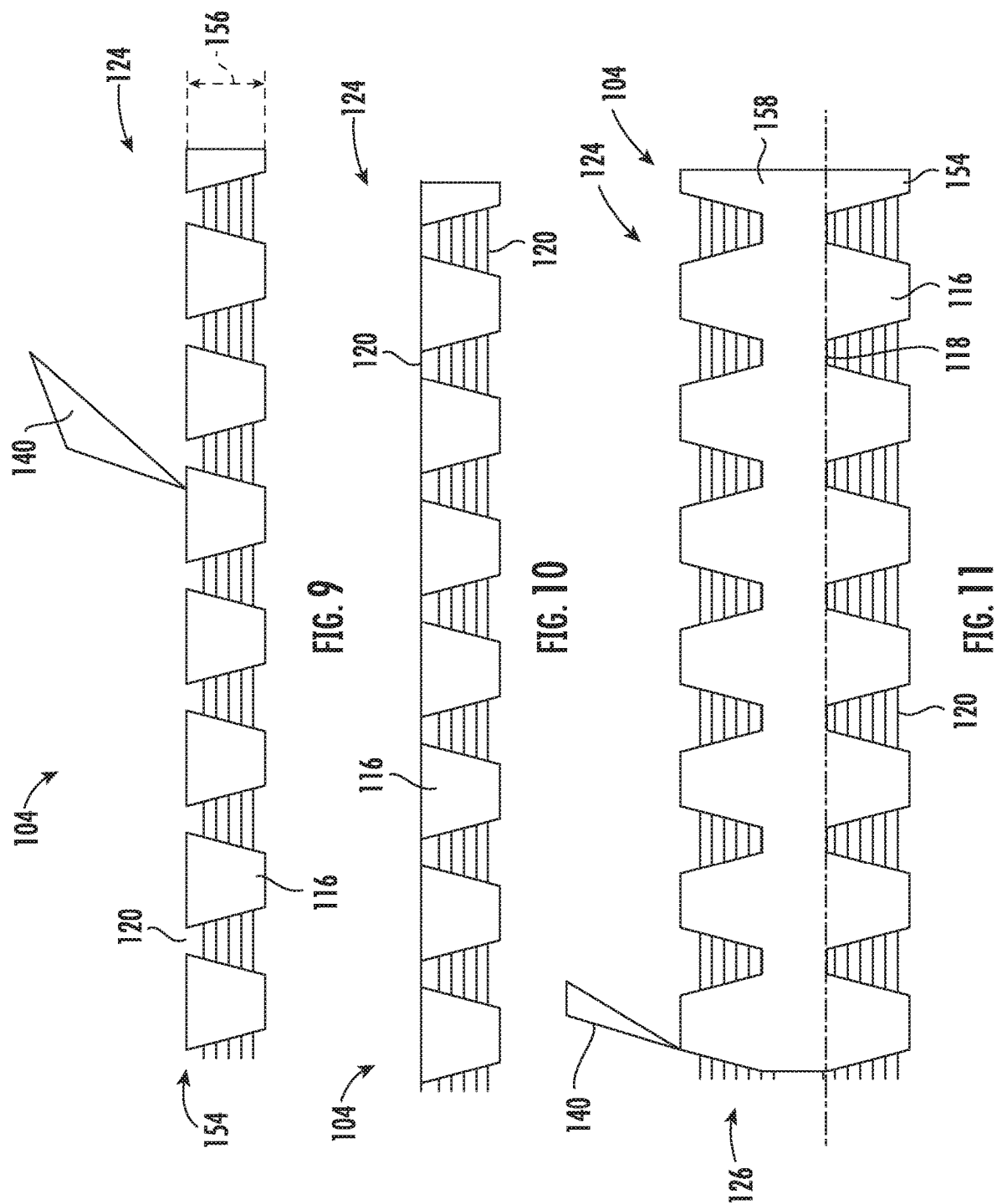

ROBOTIC ARM ASSEMBLY CONSTRUCTION

FIELD

The present subject matter relates generally to a system and method for constructing a robotic arm assembly, and more specifically a robotic arm of a robotic arm assembly.

BACKGROUND

Robotic arm assemblies are useful throughout various industries for performing operations at, e.g., remote locations, hazardous locations, etc. At least certain robotic arm assemblies include a robotic arm formed of a plurality of links joined together at respective joints. Additionally, a plurality of control wires may extend through the robotic arm, with each wire terminating at an individual link for moving such link relative to an aft-adjacent link. The control wires may be coupled to one or more motors within a base of the robotic arm assembly, such that the robotic arm assembly may control a movement of the robotic arm by increasing and/or decreasing tension on the plurality of control wires.

In order to form such a robotic arm of the robotic arm assembly, each of the individual links are typically separately formed, and individual holes are extruded or drilled for each of the plurality of control wires. The control wires are then threaded through the extruded or separately drilled holes in the links. Such a construction method, however, may make it difficult to construct relatively long and/or relatively thin robotic arms. Specifically, with such a construction method, it may be difficult to form each of the individual links with a desired density of control wire holes therein, and further may be difficult to thread the control wires (which may generally be extremely thin and flimsy) through each of the individual holes in the plurality of links of the robotic arm.

Accordingly, a method for constructing a robotic arm assembly allowing for increased ease of construction of relatively long and/or relatively thin robotic arms would be useful.

BRIEF DESCRIPTION

Aspects and advantages of the invention will be set forth in part in the following description, or may be obvious from the description, or may be learned through practice of the invention.

In one an exemplary aspect of the present disclosure, a method for constructing a robotic arm is provided. The method includes positioning a wire in a formation zone for the robotic arm; and forming a body of the robotic arm in the formation zone around the wire such that the body of the robotic arm encloses at least a portion of the wire.

In certain exemplary aspects positioning the wire in the formation zone for the robotic arm includes positioning a plurality of wires in the formation zone in tension such that the plurality of wires in the formation zone are suspended within the formation zone.

In certain exemplary aspects forming the body of the robotic arm around the wire includes forming the body of the robotic arm around the wire using an additive manufacturing process.

In certain exemplary aspects the wire is a pre-sleeved wire having a sleeve enclosing the wire.

For example, in certain exemplary aspects forming the body of the robotic arm around the wire includes forming the body of the robotic arm around the sleeve in a fixed manner such that the sleeve is fixed relative to the body.

In certain exemplary aspects an anchor is coupled to the wire, and wherein forming the body of the robotic arm around the wire further includes forming the body of the robotic arm around the anchor.

In certain exemplary aspects positioning the wire in the formation zone includes holding the wire at least partially in place through a positioning line attached to the anchor. With such an exemplary aspect, the method may further include removing the positioning line attached to the anchor subsequent to forming the body of the robotic arm in the formation zone around the wire.

In certain exemplary aspects forming the body of the robotic arm around the wire such that the body of the robotic arm encloses at least a portion of the wire includes forming a plurality of links of the body of the robotic arm and a plurality of joints movably coupling the plurality of links.

For example, in certain exemplary aspects each link of the plurality of links encloses at least a portion of the wire.

For example, in certain exemplary aspects the plurality of links and the plurality of joints are formed together using an additive manufacturing process.

In certain exemplary aspects the wire is a control wire, and wherein forming the body of the robotic arm around the wire includes forming the body of the robotic arm around the control wire such that the control wire is moveably positioned within at least a portion of the body of the robotic arm enclosing the control wire.

For example, in certain exemplary aspects forming the body of the robotic arm in the formation zone around the wire includes forming a forward link, an aft link, and a joint moveably coupling the forward link and aft link such that the control wire is moveably positioned within the aft link and fixed to the forward link.

For example, in certain exemplary aspects an anchor is coupled to the control wire, and wherein forming the body of the robotic arm in the formation zone around the wire further includes forming the forward link around the anchor to at least partially enclose the anchor.

In certain exemplary aspects, the method may further include positioning a tensile member in the formation zone for the robotic arm, and wherein forming the body of the robotic arm around the wire includes forming the body of the robotic arm around the tensile member.

In certain exemplary aspects forming the body of the robotic arm around the wire includes forming the body of the robotic arm to have an outer diameter less than about one inch.

In certain exemplary aspects forming the body of the robotic arm around the wire includes forming the body of the robotic arm to have an outer diameter less than about 0.5 inches.

In certain exemplary aspects forming the body of the robotic arm around the wire includes forming the body of the robotic arm to have a length of at least about five feet.

In certain exemplary aspects forming the body of the robotic arm around the wire includes molding a continuous component around the wire, and removing sequential portions of the continuous component to form individual links moveably coupled by a plurality of joints.

For example, in certain exemplary aspects the individual links of the body of the robotic arm enclose the wire.

In certain exemplary aspects forming the body of the robotic arm around the wire includes forming a first portion of the body of the robotic arm and forming a second portion of the body of the robotic arm, and wherein positioning the wire in the formation zone for the robotic arm includes laying the wire on the first portion of the body of the robotic arm prior to forming the second portion of the body of the robotic arm.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a schematic view of a system for constructing a robotic arm in accordance with an exemplary embodiment of the present disclosure in a first construction phase.

FIG. 4 is a schematic view of the exemplary system of FIG. 3 in a second construction phase.

FIG. 9 is a schematic view of a system for constructing a robotic arm in accordance with another exemplary embodiment of the present disclosure in a first construction phase.

FIG. 10 is a schematic view of the exemplary system of FIG. 9 in a second construction phase.

FIG. 11 is a schematic view of the exemplary system of FIG. 9 in a third construction phase.

DETAILED DESCRIPTION

Figure 1:
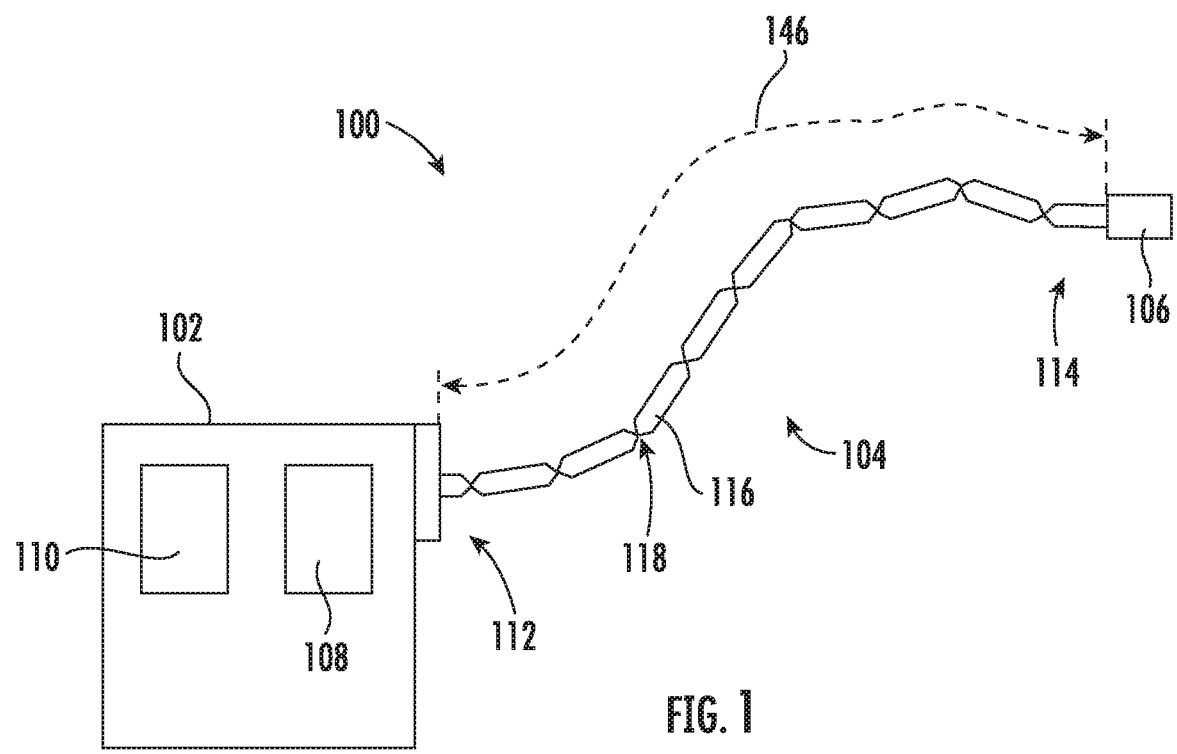
FIG. 1 is a schematic, cross-sectional view of a robotic arm assembly in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a robotic arm, forward refers to a position closer to a distal end of the robotic arm and aft refers to a position closer to a root end of the robotic arm.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the Figs., FIG. 1 is a schematic view of a robotic arm assembly 100 in accordance with an exemplary embodiment of the present disclosure. The exemplary robotic arm assembly 100 depicted generally includes a base 102, a robotic arm 104, and a utility member 106. The base 102 generally includes one or more motors 108 and a controller 110. The controller 110 is operably coupled to the one or more motors 108 for controlling operation of the robotic arm assembly 100. Additionally, the controller 110 may be operably coupled to the utility member 106 and/or one or more sensors (not shown) attached to or embedded in the robotic arm 104 and/or utility member 106. Further, the robotic arm 104 extends generally between a root end 112 and a distal end 114. The robotic arm 104 is coupled to the base 102 at the root end 112 and includes the utility member 106 at the distal end 114.

Moreover, the robotic arm 104 of the exemplary robotic arm assembly 100 depicted is generally formed of a plurality of links 116 and a plurality of joints 118, with the plurality of links 116 sequentially arranged and movably coupled to one another with the plurality of joints 118.

Figure 2:
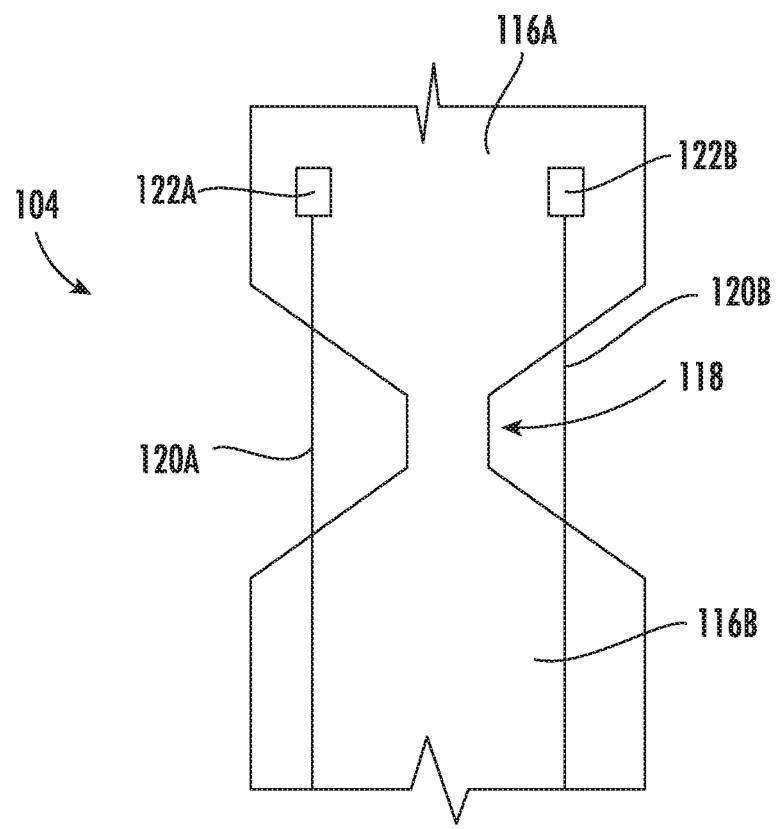
FIG. 2 is a close-up, schematic view of a robotic arm of the exemplary robotic arm assembly of FIG. 1.

Referring now also to FIG. 2, a close-up, schematic view is provided of an adjacent pair of links 116 (i.e., a forward link 116A and an aft link 116B) and a joint 118 of the exemplary robotic arm 104 of FIG. 1. For the embodiment depicted, the joint 118 is configured as a flexural joint. More specifically, the joint 118 is a section of substantially reduced cross-sectional area as compared to links 116, such that the two adjacent links 116 may bend relative to one another at the joint 118. Further, it will be appreciated that for the embodiment depicted, the robotic arm 104 includes a plurality of control wires 120 extending therethrough. For illustrative purposes, two control wires 120 are depicted in FIG. 2 (i.e., a first control wire 120A and a second control wire 120B), with each of the first and second control wires 120A, 120B terminating at the forward link 116A of the depicted pair of links 116. Accordingly, it will be appreciated that the first and second control wires 120A, 120B are each moveably positioned within (e.g., slidable relative to) the aft link 116B and are fixedly attached to the forward link 116A. More particularly, the first control wire 120A includes a first anchor 122A fixed to one side of the forward link 116A and the second control wire 120B includes a second anchor 122B fixed to another side of the forward link 116A. It will be appreciated, however, that in other exemplary embodiments, the first and second control wires 120A, 120B may be fixedly attached to the forward link 116A in any other suitable manner.

In order to bend the forward link 116A relative to the aft link 116B, one of the first control wire 120A or second control wire 120B may be pulled by, e.g., the one or more motors 108 of the base 102 of the robotic arm assembly 100. For example, in order to bend the forward link 116A clockwise in the prospective depicted in FIG. 2, the second control wire 120B may be pulled by the one or more motors 108 of the base 102, while tension may be relieved in the first control wire 120A. Conversely, in order to bend the forward link 116A counterclockwise in the prospective depicted in FIG. 2, the first control wire 120A may be pulled by the one or more motors 108 of the base 102, while tension may be relieved and the second control wire 120B.

Figure 5:
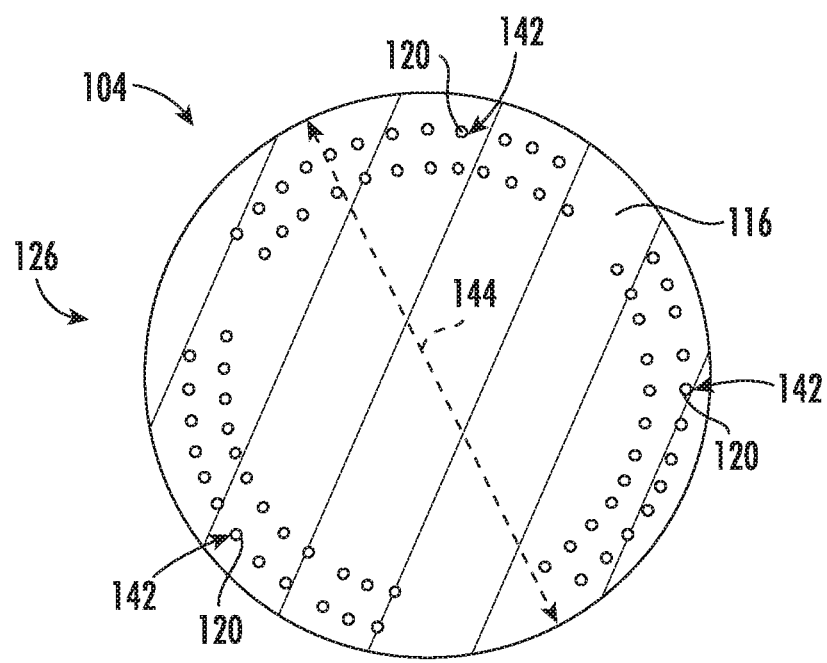
FIG. 5 is a schematic, cross-sectional view of a link of a robotic arm formed using the exemplary system of FIGS. 3 and 4.

It will be appreciated that although only two control wires 120A, 120B are depicted in FIG. 2, in other embodiments, each link 116 may have any other suitable number of control wires 120 terminating at such link 116 for controlling such link 116, or alternatively, certain links 116 of the robotic arm 104 may have no control wires 120 terminating at such link 116 (e.g., a bend applied by one set of ropes may be distributed amongst several links 116 and associated joints 118). For example, in certain embodiments, each link 116 may include three control wires 120 terminating at such link 116 to provide additional degrees of freedom for such link 116. Further, while only two wires are depicted in FIG. 2, a relatively large number of additional control wires 120 (not shown; see FIG. 5, below) may extend through such links 116 for controlling each of the links 116 forward of the links 116 depicted. By way of example only, if the robotic arm 104 were to include twenty (20) links 116, with each link 116 including three (3) control wires 120 terminating at such link 116, a link 116 proximate the root end 112 of the robotic arm 104 may include approximately sixty (60) control wires 120 extending therethrough. Further, additional wires may extend therethrough for, e.g., electrical connections for the utility member 106 and/or for the provision of working fluids for the utility member 106.

In order to efficiently construct a robotic arm 104 for such an exemplary robotic arm assembly 100, the present disclosure generally provides for the positioning of one or more control wires 120 in a formation zone 124 (see below) for the robotic arm 104, and forming a body 126 (generally including the links 116 and joints 118; see below) of the robotic arm 104 in the formation zone 124 around the one or more control wires 120, such that the body 126 of the robotic arm 104 encloses at least a portion of the one or more control wires 120.

More specifically, reference will now be made to FIGS. 3 and 4. FIG. 3 provides a schematic view of a system 128 for constructing a robotic arm 104 of a robotic arm assembly 100 in accordance with an exemplary aspect of the present disclosure at a first stage of formation, and FIG. 4 provides a schematic view of the exemplary system 128 for constructing the robotic arm 104 of the robotic arm assembly 100 at a second stage of formation. The robotic arm 104 being constructed in FIGS. 3 and 4 may be configured in substantially the same manner as the exemplary robotic arm 104 described above with reference to FIGS. 1 and 2.

Referring particularly to FIG. 3, as is depicted, the system 128 generally includes a structure for positioning the control wire 120, and more particularly, the plurality of control wires 120, in a formation zone 124 for the robotic arm 104. More specifically, for the embodiment shown, the structure includes a first jig assembly 130 and a second jig assembly 132. Each of the plurality of control wires 120 depicted extends between the first jig assembly 130 and the second jig assembly 132 between a first end 134 and a second end 136. The first jig assembly 130 is configured to hold the first ends 134 of the plurality of control wires 120 in position and the second jig assembly 132 is configured to hold the second ends 136 of the plurality of control wires 120 in position. Notably, the first jig assembly 130 includes a platform 138 through which the plurality of control wires 120 extend and on which the body 126 of the robotic arm 104 will be formed (for the embodiment depicted). In such a manner, the control wires 120 may be suspended within the formation zone 124 in a desire position/pattern. Notably, the first ends 134 of the plurality of control wires 120 may be configured for attachment to, e.g., one or more motors 108 of a base 102 of a robotic arm assembly 100 (see FIG. 1) after the formation of the robotic arm 104.

It will be appreciated, however, that in other exemplary embodiments, any other assembly may be used for holding the control wire(s) 120 in position within the formation zone 124. For example, any other suitable jig assembly may be used, and/or the control wires 120 may be suspended within a fluid bath (depending on the construction method used for the body 126 of the robotic arm 104).

Referring now particularly to FIG. 4, it will be appreciated that the exemplary system 128 is configured to form a body 126 of the robotic arm 104 in the formation zone 124 around the control wire 120, and more specifically, around the plurality of control wires 120, such that the body 126 of the robotic arm 104 encloses at least a portion of each of the plurality of control wires 120. Notably, for the embodiment shown, the body 126 of the robotic arm 104 includes a plurality of links 116, as well as a plurality of joints 118. Each joint 118 is configured to movably couple an adjacent pair of links 116 of the plurality of links 116. As noted above, for the embodiment of FIG. 4, each of the joints 118 are configured as flexural joints. However, in other embodiments, any other suitable joints 118 may be formed and utilized, such as roller joints, ball joints, etc.

More specifically, for the exemplary embodiment depicted, the exemplary system 128 is configured to form the body 126 of the robotic arm 104 in the formation zone 124 around the control wire 120 using an additive manufacturing process, such as a 3-D printing process. Such is depicted schematically in FIG. 4 with the additive manufacturing implement 140. The use of such a process may allow the body 126 of the robotic arm 104 of the robotic arm assembly 100 to be formed integrally, as a single monolithic component, or as any suitable number of sub-components, and built up around the plurality of control wires 120, such that the plurality of control wires 120 extend at least partially through the body 126 after forming the body 126. For example, such a process may allow for the formation of the body 126 of the robotic arm 104 in a manner depicted (i.e., including flexural joints between adjacent links 116), or any other suitable manner (e.g., including roller or ball joints between adjacent links 116).

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, in a vertical direction (or rather a lengthwise direction of the robotic arm), other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys. These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 5 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 5 μm, utilized during the additive formation process.

Utilizing additive manufacturing methods, even multi-part components may be formed as a single piece of continuous metal or plastic or other polymer, and may thus include fewer sub-components and/or joints as compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Referring still particularly to FIGS. 3 and 4, it will be appreciated that in such a manner, the body 126 of the robotic arm 104 may be formed using such an additive manufacturing process such that the body 126 is formed around the plurality of control wires 120. In such a manner, the plurality of control wires 120 are pre-threaded through a plurality of openings 142 in the body 126, extending through each of the links 116 of the body 126. For example, referring briefly to FIG. 5, providing a cross-sectional view of a link 116 of the exemplary robotic arm 104 depicted in FIG. 4, along a length of the exemplary robotic arm 104, it will be appreciated that forming the robotic arm 104 in accordance with one or more these exemplary aspects may allow for the plurality of control wires 120 to be pre-threaded through the individual links 116, and more specifically, through respective openings 142 in the individual links 116. Additionally, forming the body 126 of the robotic arm 104 in such a manner may allow for each of the plurality of control wires 120 to be spaced relatively close together, such that a relatively long and relatively thin robotic arm 104 may be formed. For example, for the embodiment depicted, at least certain of the plurality of control wires 120 are spaced less than about five millimeters apart from one another (measured from the center of one control wire 120 to the center of an adjacent control wire 120), such as less than about five hundred (500) micrometers (μm) apart from one another, such as less than about two hundred and fifty (250)μm apart from one another, such as less than about one hundred and fifty (150)μm apart from one another. Additionally, such may allow for the formation of the body 126 of the robotic arm 104 with an outer diameter 144 (i.e., a maximum outer diameter less than about three (3) inches, such as less than about one (1) inch, such as less than about 0.5 inches, such as less than about 0.3 inches. Despite the relatively thin robotic arm 104, due to the relatively close spacing of the plurality of control wires 120 available (i.e., a relatively high density of control wires 120), the robotic arm 104 may be formed to define a desired length. For example, in at least certain exemplary embodiments the robotic arm 104 may define a length 146 (i.e., a centerline length; see FIG. 1) of at least about three (3) feet, such as at least about five (5) feet, such as at least about six (6) feet, such as up to about one hundred (100) feet.

Notably, referring back particularly to FIGS. 3 and 4, it will be appreciated that each of the plurality of control wires 120 includes an anchor 122 coupled thereto. During the formation of the body 126 of the robotic arm 104 within the formation zone 124 around the control wire 120, the system 128 forms the body 126 around the anchors 122 that are coupled to the control wires 120, such that the anchors 122 are fixedly positioned within the respective links 116 of the body 126 (and therefore the respective control wire 120 coupled to the anchor 122 is also fixed to the link 116). In such a manner, it will be appreciated that the link 116 enclosing an anchor 122 may be controlled by such anchor 122, or rather the control wire 120 coupled to such anchor 122. For example, after the formation of the robotic arm 104, the control wires 120 may be pulled on, e.g., by one or more motors 108 of a base 102 of a robotic arm assembly 100 including the robotic arm 104 (see FIG. 1), and the anchors 122 may ensure that the control wires 120 are able to pull on a desired portion of a desired link 116 of the body 126 of the robotic arm 104 without being pulled out of position. In such a manner, the control wires 120 may be able to move such link 116 of the body 126 of the robotic arm 104 in a desired manner. In certain exemplary embodiments, the anchor 122 may be swaged onto the control wire 120, crimped to control wire 120, tied to the control wire 120, or attached in any other suitable manner. Additionally, although depicted as a generally rectangular shape in FIGS. 3 and 4, in other embodiments, the anchors 122 may have any other suitable geometry for functioning in the manner described herein.

Figure 6:
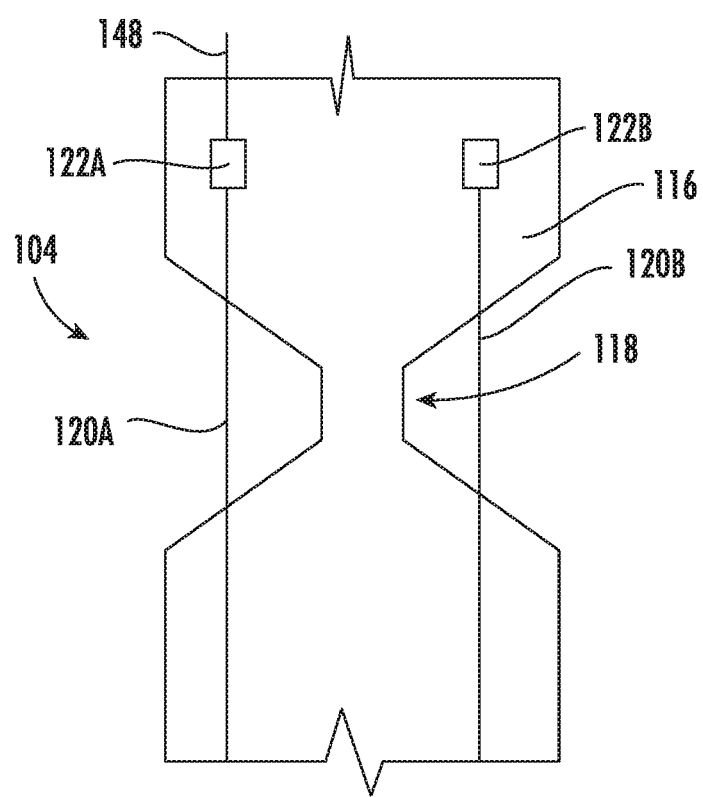
FIG. 6 is a schematic, close-up view of two links of a robotic arm of a robotic arm assembly in accordance with an exemplary aspect of the present disclosure.

Moreover, referring now briefly to FIG. 6, it will be appreciated that the plurality of control wires 120 depicted, and the respective plurality of anchors 122 depicted, are held in position during the formation process of the body 126 of the robotic arm 104, with respect to the second jig assembly 132, using a plurality of positioning lines 148. More specifically, FIG. 6 depicts a close-up view of two links 116 of a robotic arm assembly 100 having a first control wire 120A and a second control wire 120B extending therethrough. Specifically, the first control wire 120A includes a first anchor 122A coupled thereto and the second control wire 120B includes a second anchor 122B coupled thereto. The first anchor 122A is further coupled to a positioning line 148. It will be appreciated that the coupling of the positioning line 148 to the anchor 122 is done in a less robust manner than the coupling of the control wire 120 to the anchor 122. Accordingly, after the formation of the plurality of links 116 around the control wires 120 and anchors 122, such that the anchors 122 are embedded within the link 116 of the body 126 of the robotic arm 104, the positioning lines 148 may be pulled out without affecting the control wires 120. More specifically, the positioning line 148 may be pulled such that the coupling between the positioning lines 148 and the respective anchors 122 fail, while the coupling between the control wires 120 and the respective anchors 122 remains intact, allowing for the positioning lines 148 to be be removed. For the exemplary embodiment of FIG. 6, the positioning line 148 has been removed from the second anchor 122B coupled to the second control wire 120B.

Moreover, it will be appreciated that for the exemplary aspects depicted herein, forming the body 126 of the robotic arm 104 around the plurality of control wires 120 using the additive manufacturing process includes forming the body 126 of the robotic arm 104 around the plurality of control wires 120 such that the control wires 120 are moveably positioned within (e.g., slidable relative to) at least a portion of the body 126 of the robotic arm 104 enclosing such plurality of control wires 120. More specifically, the control wires 120 are moveably positioned within (e.g., slidable relative to) each of the links 116 through which the control wires 120 extend (i.e., the links 116 formed around the respective control wires 120), with the exception of the link 116 of the robotic arm 104 the respective control wire 120 is configured to control. In at least certain exemplary embodiments, such may be accomplished by forming a small opening, such as the openings 142 depicted in FIG. 5, around the location of each of the plurality of control wires 120. Additionally, certain materials may be utilized that are configured to allow for such control wires 120 to slide.

Figure 7:
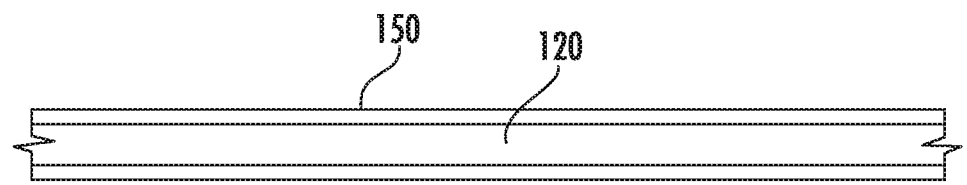
FIG. 7 is a schematic, cross-sectional view of a pre-sleeved wire in accordance with an exemplary embodiment of the present disclosure.

However, referring now to FIG. 7, in other exemplary embodiments, one or more pre-sleeved control wires may be utilized. More specifically, FIG. 7 provides a close-up, cross-sectional view of a pre-sleeved control wire having a sleeve 150 enclosing the control wire 120. The sleeve 150 may be formed of, e.g., nylon, Polytetrafluoroethylene ("PTFE"), or any other suitable material. With such an exemplary aspect, forming the body 126 of the robotic arm 104 around the control wire 120 may include forming the body 126 of the robotic arm 104 around the sleeve 150 of the pre-sleeved control wire, such that the sleeve 150 is fixed in position within the links 116 of the body 126 of the robotic arm 104, such that it may not slide relative to the links 116.

Further, still, it will be appreciated that utilizing a manufacturing method in accordance with one or more of these exemplary aspects may allow for additional features to be embedded within the body 126 of the robotic arm 104 for, e.g., strengthening the body 126 of the robotic arm 104. For example, referring now to FIG. 8, a close-up, schematic, cross-sectional view is depicted of the robotic arm 104 in accordance with another exemplary embodiment of the present disclosure. The exemplary robotic arm 104 depicted may be configured in a similar manner to one or more of the exemplary embodiment described above. Accordingly, the exemplary robotic arm 104 may generally include a plurality of links 116 and a plurality of joints 118, with each joint 118 movably coupling an adjacent pair of links 116 of the plurality of links 116. Further, the exemplary robotic arm 104 depicted in FIG. 8 may be formed in accordance with one or more the exemplary aspects described herein. Accordingly, the exemplary robotic arm 104 depicted in FIG. 8 includes a plurality of control wires 120, with the links 116 of the robotic arm 104 formed around the plurality of control wires 120.

Figure 8:
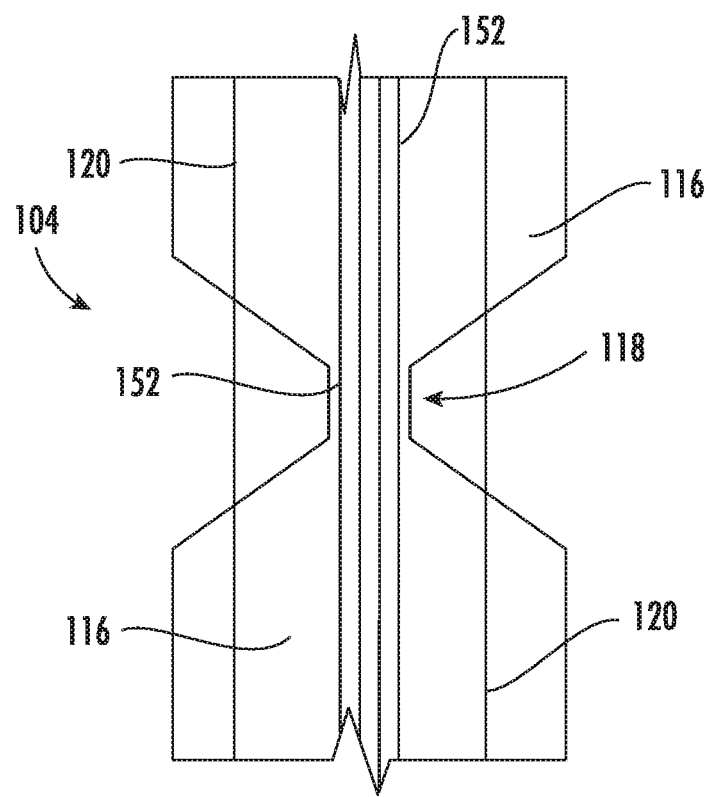
FIG. 8 is a schematic, close-up view of a plurality of links of a robotic arm in accordance with an exemplary aspect of the present disclosure including one or more tensile members.

However, in addition to the plurality of control wires 120, for the exemplary embodiment depicted in FIG. 8, the robotic arm 104 further includes one or more tensile members 152. For the embodiment shown, the one or more tensile members 152 includes a plurality of support lines. The plurality of support lines similarly extend between the first jig assembly 130 and the second jig assembly 132 (not shown in FIG. 8; similar to the control wires 120 depicted) within the formation zone 124 of the robotic arm 104 during the formation of the robotic arm 104. In such a manner, the body 126 of the robotic arm 104 may be formed around the one or more support lines, such that the support lines are embedded within the body 126 of the robotic arm 104. The support lines may act to strengthen the body 126 of the robotic arm 104 by providing additional tensile support to the links 116 and/or joints 118.

It will be appreciated, however, that in other exemplary embodiments, if one or more tensile members 152 are included, the tensile members 152 may have any other suitable shape and/or configuration. For example, in other embodiments, the one or more tensile members 152 may not be configured as support lines extending through a plurality of links 116 and joints 118, and instead may be configured as a plurality of individual, separate tensile members 152 positioned within the individual links 116 and joints 118.

Further, it will be appreciated that although the plurality of control wires 120 are generally fixed to a respective link 116 it is configured to control by forming the link 116 around an anchor 122 coupled to such control wire 120, in other exemplary aspects of the present disclosure, the plurality of control wires 120 may be fixed to a respective link 116 it is configured to control in any other suitable manner. For example, in certain exemplary aspects, the link 116 may be formed into a texture of a surface of the control wire 120 itself to fix it in position. Additionally, or alternatively, the wire 120 may be fixed through a chemical bond, such as an epoxy or other adhesive bonding. With such a case, the bonding may be applied during the formation of the link 116, or a section of the wire 120 intended to be fixed to the link 116 may be primed with an adhesive or adhesive promoter such that the desired portion fixes to the link 116 and the remaining portion does not. Additionally, or alternatively, when a pre-sleeved control wire 120 is used, a portion of the sleeve 150 may be stripped from the wire 120 to expose the wire 120 and the link 116 may be formed to the exposed portion of the wire 120. Additionally, or alternatively, still, a portion of the wire 120 may be fused, melted, welded, brazed, etc. to the link 116 during the formation of the link 116 by, e.g., a laser from the additive process or another tool.

Moreover, it will be appreciated that in other exemplary aspects of the present disclosure, any other suitable method may be utilized for constructing a robotic arm 104 of a robotic arm assembly 100 by positioning one or more control wires 120 in a formation zone 124 of the robotic arm 104 and forming a body 126 of the robotic arm 104 in the formation zone 124 around the one or more control wires 120.

For example, referring briefly to FIGS. 9 through 11, another exemplary aspect of the present disclosure is depicted. For the exemplary embodiment of FIGS. 9 through 11, a body 126 a robotic arm 104 may again be formed generally using an additive manufacturing process. Specifically, for the exemplary aspect depicted, a plurality of layers of the robotic arm 104 may be formed, with the robotic arm 104 in a horizontal orientation. For example, an implement 140 is depicted in FIGS. 9 and 11, schematically representing the addition of the layers through a suitable additive manufacturing process.

Referring first particularly to FIG. 9, an initial, first portion 154 of the body 126 of the robotic arm 104 has been formed through an additive manufacturing process. As the robotic arm 104 is built up (i.e., layer by layer through additive manufacturing) such that a depth 156 is obtained where a control wire 120 should be positioned, the additive manufacturing process may be paused, and a control wire 120 maybe laid in position across the unfinished robotic arm 104 (e.g., of the first portion 154 of the body 126 of the robotic arm 104). Such a process step is depicted in FIG. 10. Subsequently, after the control wire(s) 120 are in position, additional layers of the robotic arm 104 are formed through the additive manufacturing process, such that the body 126 of the robotic arm 104 is formed around the control wire(s) 120 laid in position across the first portion 154 of the body 126 of the robotic arm 104. In such a manner, the body 126 of the robotic arm 104 encloses at least a portion of the plurality of control wires 120. Specifically, regarding the example described with reference to FIG. 10, a second portion 158 of the body 126 of the robotic arm 104 may be formed around the control wire 120 laid in position on the first portion 150 for the body of the robotic arm 104. Such a process step is depicted in FIG. 11.

Notably, although not depicted, with such an exemplary process, the links 116 may be formed with indentations for the control wires 120 and/or an anchor(s) 122 of the control wire 120, such that the control wire(s) 120 and anchor(s) 122 may be laid in position when the appropriate layer is finished. With such an exemplary aspect, the anchor 122 may or may not be held in position using one or more positioning lines.

Similar pauses in the additive manufacturing process may be taken at each depth where one or more control wires 120 should be positioned, such that at the completion of the formation of the body 126 of the robotic arm 104, each of the control wires 120 are threaded through/positioned in the body 126 of the robotic arm 104.

It will further be appreciated, however, that in still other exemplary embodiments, still other processes may be utilized for forming a robotic arm 104 in accordance with an exemplary aspect of the present disclosure. For example, referring now to FIGS. 12 through 14, yet another exemplary process for forming a robotic arm 104 in accordance with an exemplary aspect of the present disclosure is depicted.

Figure 12:
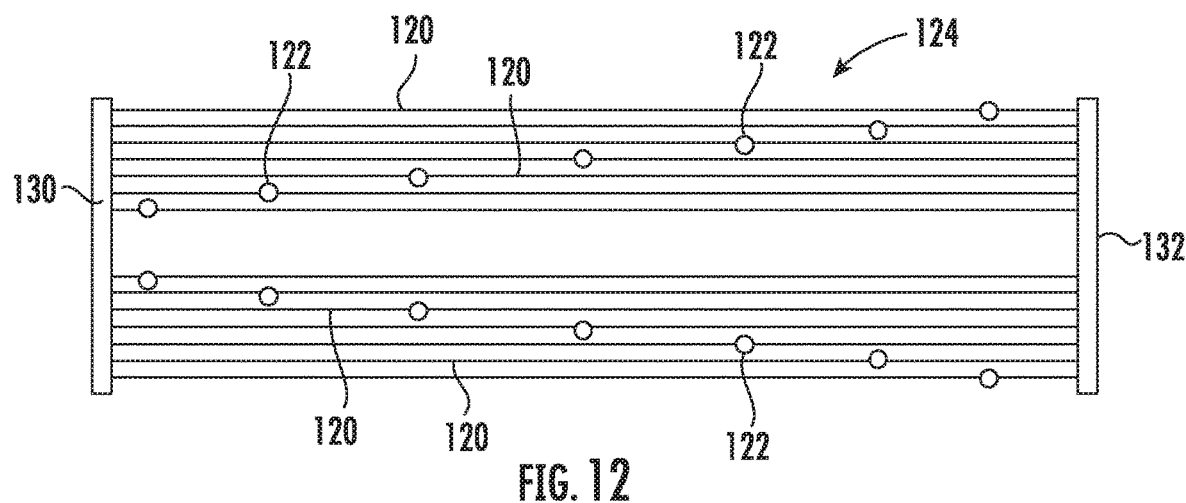
FIG. 12 is a schematic view of a system for constructing a robotic arm in accordance with yet another exemplary embodiment of the present disclosure in a first construction phase.
Figure 13:
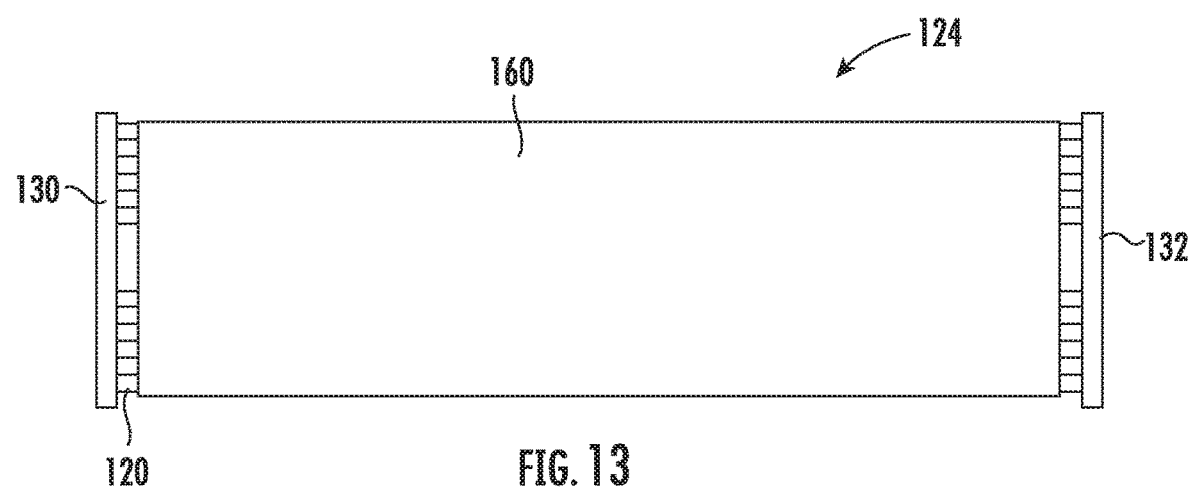
FIG. 13 is a schematic view of the exemplary system of FIG. 12 in a second construction phase.
Figure 14:
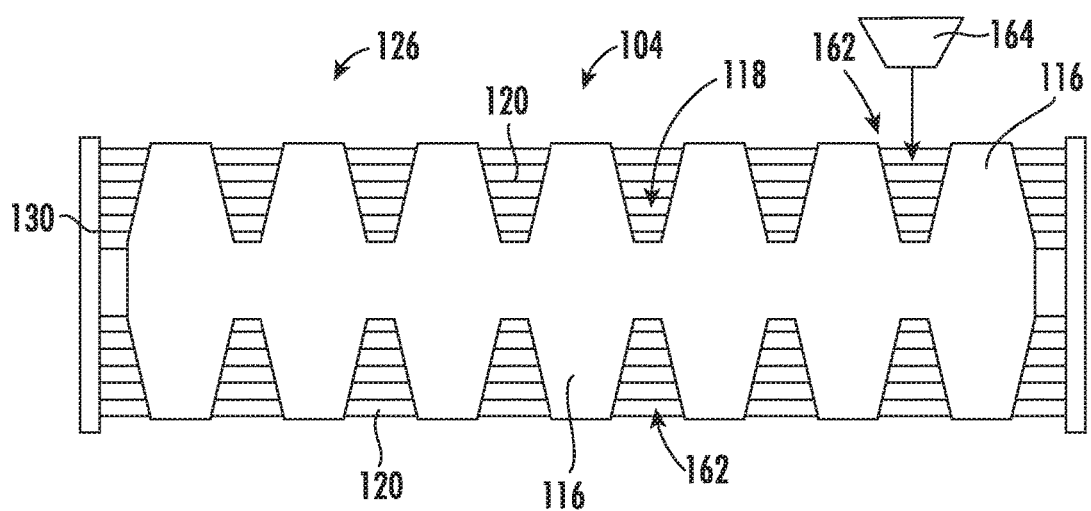
FIG. 14 is a schematic view of the exemplary system of FIG. 12 in a third construction phase.

The exemplary robotic arm 104 formed in FIGS. 12 through 14 may be configured in a similar manner to one or more of the exemplary embodiments described above. For example, the robotic arm 104 being formed may have a plurality of links 116 and a plurality of joints 118, with each joint 118 movably coupling an adjacent pair of links 116 of the plurality of links 116. Additionally, the robotic arm 104 being formed may include a plurality of control wires 120 enclosed by at least a portion of the body 126 of the robotic arm 104 for controlling movement of the links 116 of the robotic arm 104.

Similar to the exemplary aspects described above, for the exemplary aspect of FIGS. 12 through 14, one or more control wires 120 are positioned in a formation zone 124 for the robotic arm 104. Specifically, as is depicted in FIG. 12, each of the plurality of control wires 120 of the robotic arm 104 are suspended within the formation zone 124 using a first jig assembly 130 and a second jig assembly 132. However, for the exemplary aspect depicted in FIGS. 12 through 14, the body 126 of the robotic arm 104 is formed by molding a continuous component 160 around each of the plurality of control wires 120, as is depicted in FIG. 13, and subsequently, removing sequential portions 162 from the continuous component 160 to form the individual links 116 coupled by individual joints 118, as is depicted in FIG. 14. The continuous component 160 defines a substantially constant cross-sectional shape along substantially an entire length of thereof. Removing the sequential portions 162 may include removing these portions 162 using an ablation process configured to remove the material forming the continuous component 160, without damaging the plurality of control wires 120 extending therethrough. For example, the continuous component 160 may be formed of a plastic or polymer material, while the plurality of control wires 120 are formed of a metal material. With such an exemplary embodiment, the ablation process may utilize a waterjet assembly 164 (using a high pressure water stream) configured to remove the plastic material of the continuous component 160, without damaging the metal material of the plurality of control wires 120 (which is a more robust material than the plastic or polymer material forming the continuous component 160).

Figure 15:
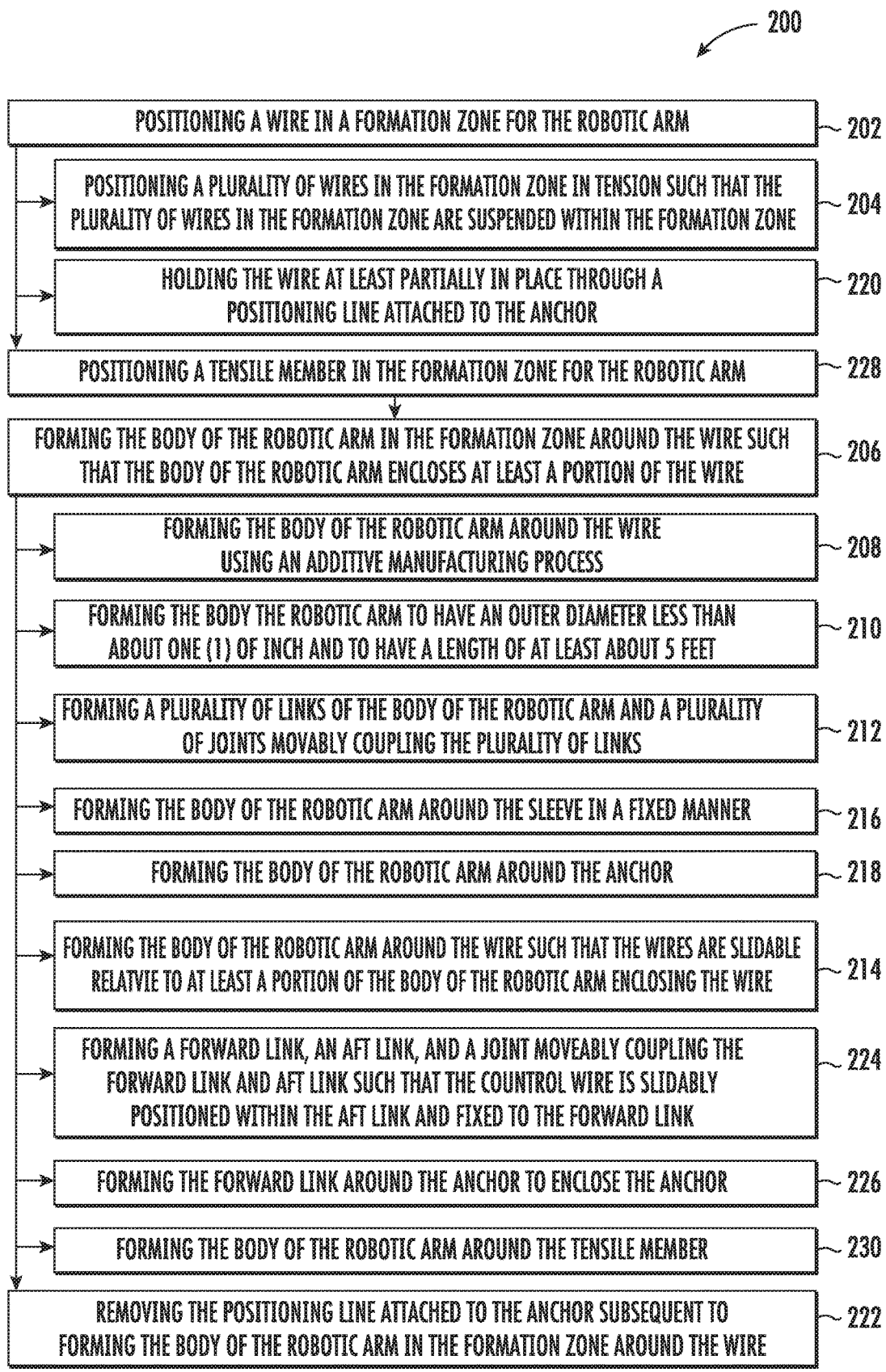
FIG. 15 is a flow diagram of a method for constructing a robotic arm of a robotic arm assembly in accordance with an exemplary aspect of the present disclosure.
Figure 16:
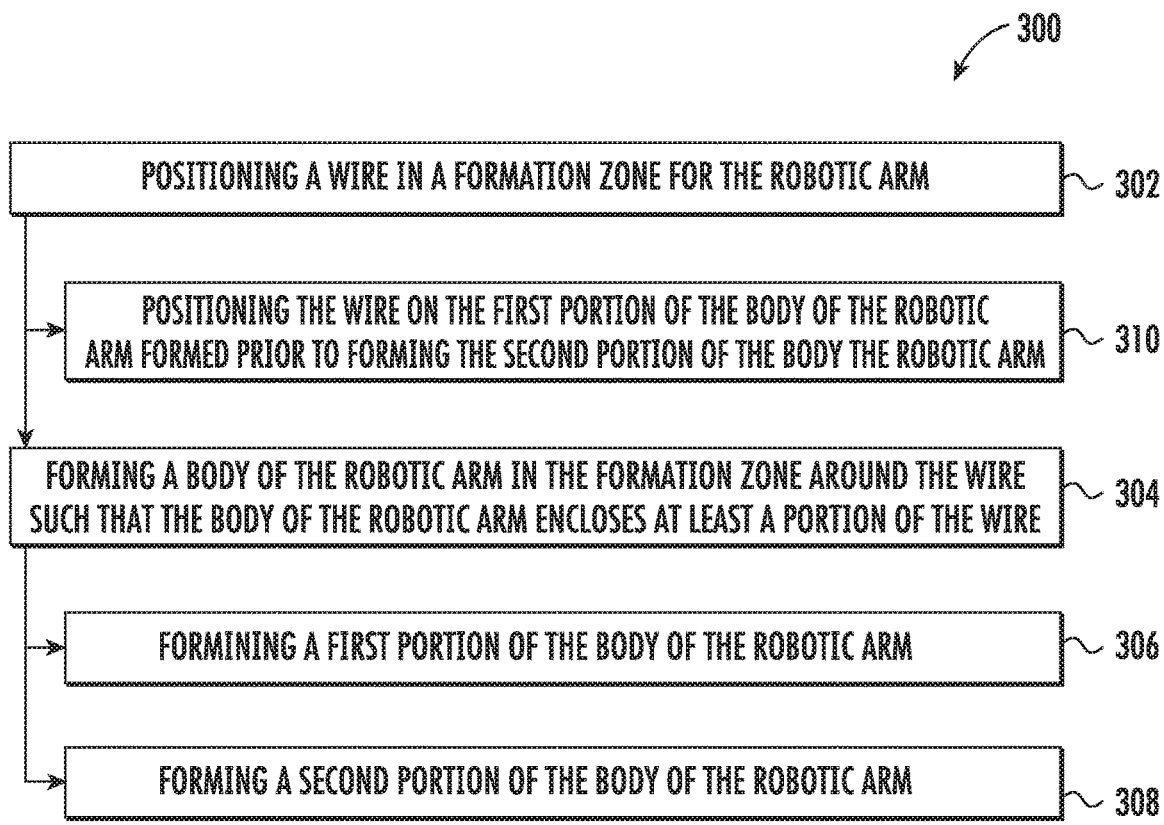
FIG. 16 is a flow diagram of a method for constructing a robotic arm of a robotic arm assembly in accordance with another exemplary aspect of the present disclosure.
Figure 17:
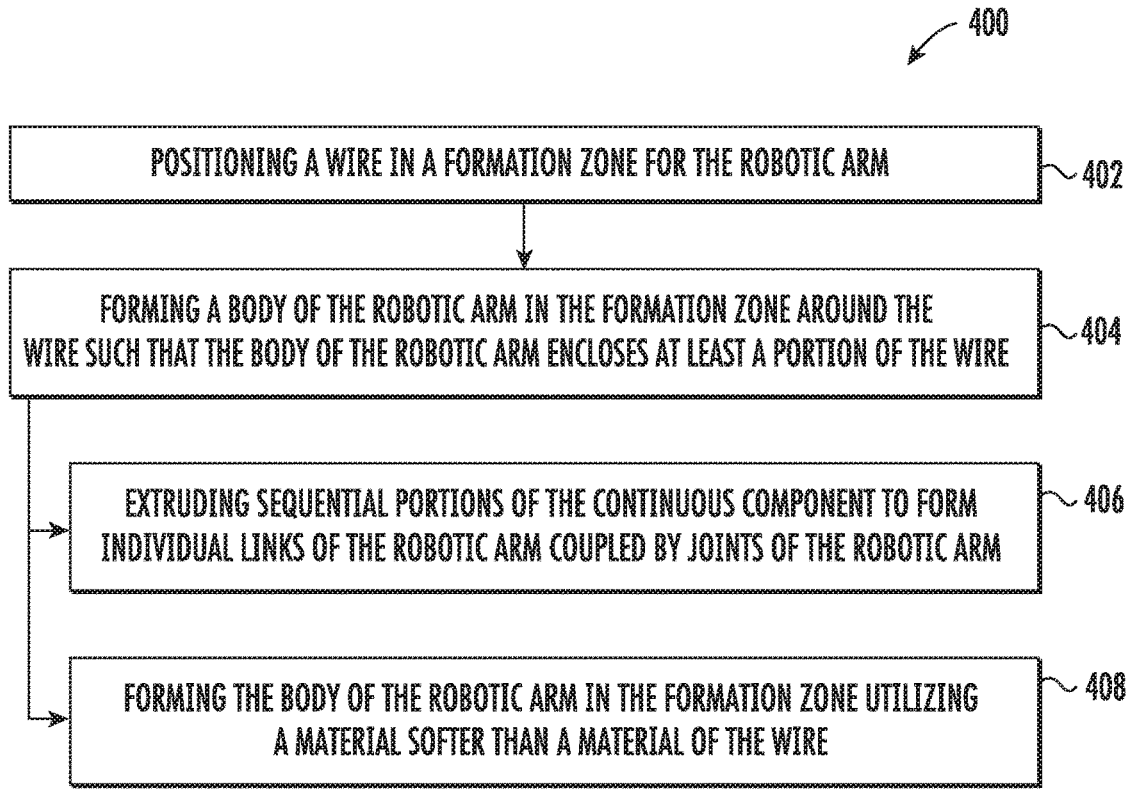
FIG. 17 is a flow diagram of a method for constructing a robotic arm of a robotic arm assembly in accordance with yet another exemplary aspect of the present disclosure.

Referring now to FIG. 15, a method 200 for constructing a robotic arm in accordance with an exemplary aspect of the present disclosure is depicted. The exemplary robotic arm constructed in accordance with the method 200 may be configured in a similar manner to one or more of the exemplary robotic arms described above. For example, the robotic arm may generally include a body having a plurality of links and a plurality of joints, with each joint movably coupling a pair of adjacent links of the plurality of links.

The method 200 generally includes at (202) positioning a wire in a formation zone for the robotic arm. More specifically, for the exemplary aspect depicted, positioning the wire in the formation zone for the robotic arm at (202) includes at (204) positioning a plurality of wires in the formation zone in tension such that the plurality of wires in the formation zone are suspended within the formation zone. Such may be accomplished by utilizing one or more jig assemblies, with the plurality of wires extending between such jig assemblies.

The method 200 further includes at (206) forming the body of the robotic arm in the formation zone around the wire such that the body of the robotic arm encloses at least a portion of the wire. More specifically, when positioning the wire at (202) includes positioning a plurality of wires in the formation zone at (204), forming the body of the robotic arm at (206) may include forming the body of the robotic arm in the formation zone around each of the plurality of wires such that the body of the robotic arm encloses at least a portion of each of the plurality of wires.

It will be appreciated that for the exemplary aspect depicted, forming the body of the robotic arm around the wire at (206) includes at (208) forming the body of the robotic arm around the wire (or plurality of wires) using an additive manufacturing process. As will be appreciated from the description above, any suitable additive manufacturing process may be utilized. In such a manner, forming the body of the robotic arm around the wire using an additive manufacturing process at (208) may include sequentially forming a plurality of layers of the body of the robotic arm to build the body of the robotic arm around the wire, or plurality of wires positioned within the formation zone at (202).

Additionally, it will be appreciated that such may enable the formation of a robotic arm having a relatively dense arrangement of control wires extending therethrough. Accordingly, it will be appreciated that with such an exemplary aspect, forming the body of the robotic arm around the wire at (206) may include at (210) forming the body of the robotic arm to have an outer diameter less than about one (1) inch and to have a length of at least about 5 feet. Of course, however, in other exemplary aspects, the body of the robotic arm may have any other suitable outer diameter and/or any other suitable length.

Referring still to the exemplary aspect of FIG. 15, it will be appreciated, that forming the body of the robotic arm around the wire such that the body of the robotic arm encloses at least a portion of the wire at (206) also includes at (212) forming a plurality of links of the body of the robotic arm and a plurality of joints movably coupling the plurality of links. In such a manner, one or more of the links of the plurality of links encloses at least a portion of the wire.

With the exception of the link of the body of the robotic arm to be controlled by a particular wire, the particular wire may need to be capable of sliding relative to the links through which it extends. Accordingly, for the exemplary aspect depicted, forming the body of the robotic arm around the wire such that the robotic arm encloses at least a portion of the wire at (206) additionally includes at (214) forming the body of the robotic arm around the wire such that the wires are moveably positioned within (e.g., slidable relative to) at least a portion of the body of the robotic arm enclosing the wire. Notably, in certain exemplary aspects, such may be accomplished by forming the body of the robotic arm with a clearance/gap around the wire (or more specifically around each of the plurality of wires). However, for the exemplary aspect depicted, such is accomplished by utilizing a pre-sleeved wire having a sleeve enclosing the wire. With such an exemplary aspect, forming the body of the robotic arm around the wire at (206) includes at (216) forming the body of the robotic arm around the sleeve in a fixed manner.

Further, it will be appreciated that in a certain exemplary aspects, an anchor may be coupled to the wire to ensure the wire has traction with the link it is configured to control. For example, the anchor may define a geometry to prevent it from sliding when pulled on (e.g., a diameter greater than a diameter of the wire, a varying diameter along its length, etc.). With such an exemplary aspect, such as the exemplary aspect depicted, forming the body of the robotic arm around the wire at (206) further includes at (218) forming the body of the robotic arm around the anchor. In such a manner, it will be appreciated that positioning the wire in the formation zone at (202) further includes at (220) holding the wire at least partially in place through a positioning line attached to the anchor. The method 200 accordingly further includes at (222) removing the positioning line attached to the anchor subsequent to forming the body of the robotic arm in the formation zone around the wire at (206).

As noted above, in at least one exemplary aspect, forming the body of the robotic arm around the wire at (206) includes at (214) forming the body of the robotic arm around the wire such that the wire is moveably positioned within (e.g., slidable relative to) at least a portion of the body of the robotic arm enclosing the wire. By way of example only, with such an exemplary aspect, forming the body of the robotic arm in the formation zone around the wire at (206) may further include at (224) forming a forward link, an aft link, and a joint moveably coupling the forward link and aft link such that the control wire is moveably (e.g., slidably) positioned within the aft link and fixed to the forward link. More specifically, still, for the exemplary aspect depicted, an anchor is coupled to the control wire, and forming the body of the robotic arm in the formation zone around the wire at (206) further includes at (226) forming the forward link around the anchor to enclose the anchor.

Referring still to the exemplary aspect depicted in FIG. 15, in order to increase a strength of the body of the robotic arm, the exemplary method 200 depicted further includes at (228) positioning a tensile member in the formation zone for the robotic arm. With such an exemplary embodiment, forming the body of the robotic arm around the wire at (206) further includes at (230) forming the body of the robotic arm around the tensile member. In certain exemplary aspects, the tensile member may be a support line. Regardless, the tensile member may provide additional support for the body of the robotic arm by increasing a tensile strength of the body of the robotic arm.

With such an exemplary aspect, it will be appreciated that the body of the robotic arm may generally be formed around the wire, or plurality of wires using an additive manufacturing process, to result in a substantially fully assembled robotic arm with wires (e.g., control wires) integrated therein. Such may provide for a more efficiently constructed, more compact, and potentially stronger robotic arm for robotic arm assembly.

It will be appreciated, however, that in other exemplary aspects, any other suitable methods may be utilized for constructing a robotic arm of the present disclosure. For example, referring briefly to FIG. 15, a method 300 for constructing a robotic arm in accordance with another exemplary aspect of the present disclosure is depicted. The exemplary method 300 may be similar to the exemplary method 200 described above. For example, the exemplary method 300 generally includes at (302) positioning a wire in a formation zone for the robotic arm. The method 300 additionally includes at (304) forming a body of the robotic arm in the formation zone around the wire such that the body of the robotic arm encloses at least a portion of the wire. However, for the exemplary aspect depicted, forming the body of the robotic arm at (304) includes at (306) forming a first portion of the body of the robotic arm and at (308) forming a second portion of the body of the robotic arm. With such an exemplary aspect, positioning the wire and the formation zone for the robotic arm at (302) includes at (310) positioning the wire on the first portion of the body of the robotic arm formed at (306) prior to forming the second portion of the body of the robotic arm at (308).

Additionally, although not depicted, it will be appreciated that in certain exemplary aspects, forming the robotic arm in the formation zone around the wire at (304) may further include sequentially forming a plurality of individual portions of the body of the robotic arm. With such an exemplary aspect, positioning the wire in the formation zone for the robotic arm at (302) may include positioning a plurality of wires, each wire positioned on one of the individual, sequentially formed portions of the body of the robotic arm such that a subsequent portion of the body of the robotic arm may be formed therearound. In such a manner, the robotic arm may generally be sequentially formed, such that the resulting robotic arm includes a plurality of wires integrally formed therewith. For example, in certain exemplary aspects, there may be at least three (3) sequential portions of the body formed, such as at least ten (10) sequential portions, and up to about one thousand 1000 portions. Similarly, with one or more of these exemplary aspects, the body may have at least three wires positioned therein (i.e., between the sequentially formed portions of the body), such as at least about nine (9) wires, such as up to about 1000 wires.

However, in still other exemplary aspects, still other suitable methods may be utilized for constructing a robotic arm. For example, referring now to FIG. 15, a method 400 for constructing a robotic arm in accordance with another exemplary aspect of the present disclosure is depicted. The exemplary method 400 may be similar to the exemplary method 200 described above. For example, the exemplary method 400 generally includes at (402) positioning a wire in a formation zone for the robotic arm. The method 400 additionally includes at (404) forming a body of the robotic arm in the formation zone around the wire such that the body of the robotic arm encloses at least a portion of the wire. However, for the exemplary aspect depicted, forming the body of the robotic arm at (404) includes molding a continuous component around the wire, and at (406) removing sequential portions of the continuous component to form individual links of the robotic arm coupled by joints of the robotic arm. With such an exemplary aspect, the individual links of the body of the robotic arm encloses the wire. In certain exemplary aspects, removing sequential portions of the continuous component to form the individual links and joints at (406) may include utilizing a waterjet extrusion process. However, in other exemplary aspects, any other suitable extrusion process may be utilized. For example, it will be appreciated that in certain exemplary aspects, forming the body of the robotic arm in the formation zone around the wire at (404) further includes at (408) forming the body of the robotic arm in the formation zone utilizing a material softer than a material of the wire. Such an exemplary aspect, the material of the continuous component formed may be removed without damaging the material of the wire.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for constructing a robotic arm comprising:
positioning a plurality of wires in a formation zone for the robotic arm; and
forming a body of the robotic arm in the formation zone around the plurality of wires such that the body of the robotic arm encloses at least a portion of each of the plurality of wires and defines a plurality of openings with each wire in the plurality of wires extending through at least one respective opening of the plurality of openings,
wherein the plurality of wires comprises one or more control wires,
wherein forming the body of the robotic arm around the plurality of wires comprises forming the body of the robotic arm around the one or more control wires such that the one or more control wires are moveably positioned within at least a portion of the body of the robotic arm enclosing the one or more control wires,
wherein forming the body of the robotic arm around the one or more control wires comprises forming the body of the robotic arm around the one or more control wires using an additive manufacturing process, wherein the additive manufacturing process comprises building up successive layers of additive materials, and wherein the additive materials comprise at least one of plastic, metal, ceramic, polymer, epoxy, and photopolymer resin,
wherein forming the body of the robotic arm around the plurality of wires such that the body of the robotic arm encloses at least a portion of the plurality of wires comprises forming a plurality of links of the body of the robotic arm and a plurality of joints movably coupling the plurality of links, and
wherein each control wire of the one or more control wires terminates at a corresponding link in the plurality of links, wherein a first control wire of the one or more control wires terminates at a first link of the plurality of links and a second control wire of the one or more control wires terminates at a second link of the plurality of links.

2. The method of claim 1, wherein positioning the plurality of wires in the formation zone for the robotic arm comprises positioning the plurality of wires in the formation zone in tension such that the plurality of wires in the formation zone are suspended within the formation zone.

3. The method of claim 1, wherein each link of the plurality of links encloses at least a portion of one of the wires in the plurality of wires.

4. The method of claim 1, wherein the plurality of links and the plurality of joints are formed together using the additive manufacturing process.

5. The method of claim 1, further comprising:
positioning a tensile member in the formation zone for the robotic arm, and wherein forming the body of the robotic arm around the plurality of wires comprises forming the body of the robotic arm around the tensile member.

6. The method of claim 1, wherein forming the body of the robotic arm around the plurality of wires comprises forming the body of the robotic arm to have an outer diameter less than about one inch.

7. The method of claim 1, wherein forming the body of the robotic arm around the plurality of wires comprises forming the body of the robotic arm to have an outer diameter less than about 0.5 inches.

8. The method of claim 1, wherein forming the body of the robotic arm around the plurality of wires comprises forming the body of the robotic arm to have a length of at least about five feet.

9. The method of claim 1, wherein forming the body of the robotic arm around the plurality of wires comprises forming a first portion of the body of the robotic arm and forming a second portion of the body of the robotic arm, and wherein positioning the plurality of wires in the formation zone for the robotic arm comprises laying the plurality of wires on the first portion of the body of the robotic arm prior to forming the second portion of the body of the robotic arm.

10. The method of claim 1, wherein the additive materials further comprise at least one of pure metals, nickel alloys, chrome alloys, titanium, titanium alloys, magnesium, magnesium alloys, aluminum, aluminum alloys, nickel-based superalloys, and cobalt-based superalloys.

11. The method of claim 1, wherein one of the plurality of wires is a pre-sleeved wire having a sleeve enclosing the wire.

12. The method of claim 11, wherein forming the body of the robotic arm around the plurality of wires comprises forming the body of the robotic arm around the sleeve in a fixed manner such that the sleeve is fixed relative to the body.

13. The method of claim 1, wherein forming the body of the robotic arm in the formation zone around the plurality of wires comprises forming a forward link, an aft link, and a joint moveably coupling the forward link and the aft link such that at least one of the one or more control wires is moveably positioned within the aft link and fixed to the forward link.

14. The method of claim 13, wherein one or more anchors are coupled to the one or more control wires, and wherein forming the body of the robotic arm in the formation zone around the plurality of wires further comprises forming the forward link around at least one of the one or more anchors to at least partially enclose at least one of the one or more anchors.

15. A method for constructing a robotic arm comprising:
positioning a plurality of wires in a formation zone for the robotic arm; and forming a body of the robotic arm in the formation zone around the plurality of wires such that the body of the robotic arm encloses at least a portion of each of the plurality of wires and defines a plurality of openings with each wire in the plurality of wires extending through at least one respective opening of the plurality of openings, wherein the plurality of wires comprises one or more control wires, wherein forming the body of the robotic arm around the plurality of wires comprises forming the body of the robotic arm around the one or more control wires such that the one or more control wires are moveably positioned within at least a portion of the body of the robotic arm enclosing the one or more control wires, wherein forming the body of the robotic arm around the one or more control wires comprises molding a continuous component around the plurality of wires, and removing sequential portions of the continuous component to form a plurality of individual links moveably coupled by a plurality of joints, and wherein each control wire of the one or more control wires terminates at a corresponding link in the plurality of individual links, wherein a first control wire of the one or more control wires terminates at a first link of the plurality of individual links and a second control wire of the one or more control wires terminates at a second link of the plurality of individual links.

16. The method of claim 15, wherein the plurality of individual links of the body of the robotic arm encloses the plurality of wires.

17. A method for constructing a robotic arm comprising:
positioning a wire in a formation zone for the robotic arm, wherein an anchor is coupled to the wire;
holding the wire at least partially in place through a positioning line attached to the anchor;
forming a body of the robotic arm in the formation zone around the wire such that the body of the robotic arm encloses at least a portion of the wire, wherein forming the body of the robotic arm around the wire further comprises forming the body of the robotic arm around the anchor and enclosing the anchor; and
removing the positioning line attached to the anchor subsequent to forming the body of the robotic arm in the formation zone around the wire.

18. The method of claim 17, wherein the wire is a plurality of control wires, wherein a plurality of anchors are coupled to the plurality of control wires, wherein forming the body of the robotic arm in the formation zone around the wire comprises forming a plurality of links such that the plurality of anchors are fixedly positioned within the respective links of the body, and wherein forming the body of the robotic arm in the formation zone around the wire further comprises defining a plurality of openings with each wire in the plurality of control wires extending through at least one respective opening of the plurality of openings.

19. A method for constructing a robotic arm comprising:
positioning a plurality of wires in a formation zone for the robotic arm;
forming a body of the robotic arm in the formation zone around the plurality of wires such that the body of the robotic arm encloses at least a portion of each of the plurality of wires and defines a plurality of openings with each wire in the plurality of wires extending through at least one respective opening of the plurality of openings,
wherein the plurality of wires comprises one or more control wires, and
wherein forming the body of the robotic arm around the plurality of wires comprises forming the body of the robotic arm around the one or more control wires such that the one or more control wires are moveably positioned within at least a portion of the body of the robotic arm enclosing the one or more control wires;
holding a first plurality of ends of the one or more control wires using a first jig assembly; and
holding a second plurality of ends of the one or more control wires using a second jig assembly.

20. The method of claim 19, wherein forming the body of the robotic arm around the one or more control wires comprises forming the body of the robotic arm around the one or more control wires using an additive manufacturing process, wherein the additive manufacturing process comprises building up successive layers of additive materials, and wherein the additive materials comprise at least one of plastic, metal, ceramic, polymer, epoxy, and photopolymer resin.

21. The method of claim 19, wherein forming the body of the robotic arm around the wire comprises molding a continuous component around the plurality of wires, and removing sequential portions of the continuous component to form individual links moveably coupled by a plurality of joints.

* * * * *

UNITED STATES PATENT AND TRADEMARK OFFICE
CERTIFICATE OF CORRECTION

PATENT NO. : 11,458,641 B2  
APPLICATION NO. : 15/986978  
DATED : October 4, 2022  
INVENTOR(S) : Graham et al.

Page 1 of 1

It is certified that error appears in the above-identified patent and that said Letters Patent is hereby corrected as shown below:

On the Title Page

In Item (72), under "Inventors", insert --Charles Burton Theurer, Alplaus, NY--, therefor.

Signed and Sealed this  
Tenth Day of September, 2024

Katherine Kelly Vidal  
*Director of the United States Patent and Trademark Office*